United States Patent [19]
Schroder

[11] 3,845,625
[45] Nov. 5, 1974

[54] HEAT ACCUMULATOR
[75] Inventor: Johann Schroder, Aachen, Germany
[73] Assignee: U. S. Philips Corporation, New York, N.Y.
[22] Filed: Sept. 28, 1972
[21] Appl. No.: 293,120

Related U.S. Application Data
[62] Division of Ser. No. 174,357, Aug. 24, 1971, Pat. No. 3,709,209.

[30] Foreign Application Priority Data
Aug. 29, 1970  Netherlands ...................... 7012830
June 23, 1971  Netherlands ...................... 7108625

[52] U.S. Cl. .................................... 60/524, 60/36
[51] Int. Cl. ............................................ F02g 1/00
[58] Field of Search ................ 60/36, 24; 126/400; 165/104; 252/70, 71

[56] References Cited
UNITED STATES PATENTS
3,029,596   4/1962   Hanold et al. ...................... 60/524
3,397,533   8/1968   Steiner et al. ...................... 60/524 X Primary Examiner—Edgar W. Geoghegan
Assistant Examiner—H. Burks, Sr.
Attorney, Agent, or Firm—Frank R. Trifari

[57] ABSTRACT

In combination with a heat accumulating machine or oven a heat accumulator which comprises a eutectic mixture of LiF and fluoride having a melting point of less than 850°C of the group constituted by sodium fluoride and/or magnesium fluoride. The mixture may additionally comprise potassium fluoride and/or calcium fluoride. The heat accumulator is suitable for supplying thermal energy to a hot-gas engine and for use in heat accumulating ovens.

8 Claims, 1 Drawing Figure

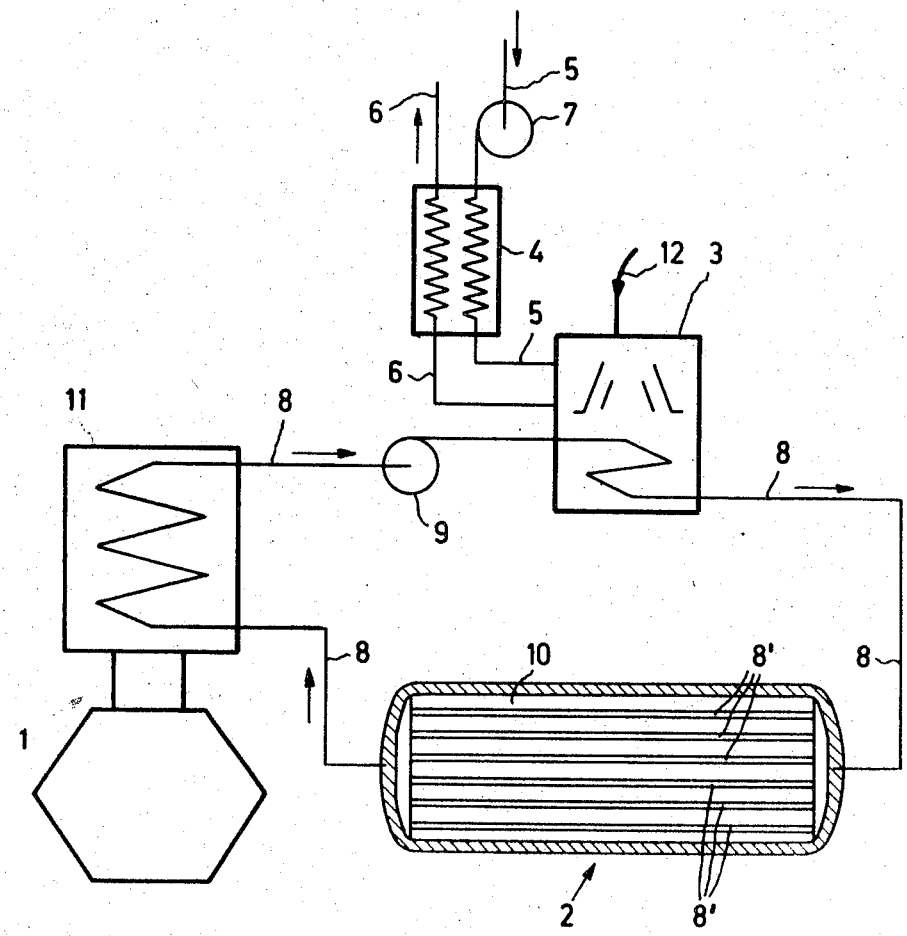

HEAT ACCUMULATOR

Heat Accumulator, a divisional case of parent application filed Aug. 24, 1971, Ser. No. 174,357 now issued U.S. Pat. No. 3,709,209.

BACKGROUND OF THE INVENTION

The invention relates to a heat accumulator comprising a reservoir which contains an inorganic material suitable for accumulating heat and means for supplying and conducting away heat. The invention particularly relates to heat accumulators having a high heat accumulating output per unit volume and weight, for example, for use as an accumulating oven for room heating or in combination with heat energy machines such as hot-gas engines.

Combinations of hot-gas engines and heat accumulators in which the heat accumulator is in heat exchanging contact with the heater of the hot-gas engine either directly or by means of a heat transporting system are used, for example in those cases where a primary heat source is not continuously available or cannot be used. In this case the use of solar energy may be considered which is only available for a part of the 24-hour period. If the primary heat source requires the supply of air and the removal of combustion gases, similar situations may occur. Consider in this case under-water uses and vehicles which are used in areas where the removal of combustion gases in the atmosphere is prohibited or is subject to stringent restrictions.

The use of a heat accumulator for the supply of heat to a hot-gas engine is known per se. It has been proposed to use a heat accumulator for this purpose, which in its simplest form consists of a reservoir filled with lithium hydride (melting point 680°C), lithium hydroxide (melting point 450°C) or lithium fluoride (melting point 848°C) (see U.S. Pat. No. 3,080,706).

As compared with the other compounds mentioned in the patent specification, lithium fluoride has the highest heat content per unit volume, and it is stable at temperatures up to 900°C, and is not very chemically aggressive when it is anhydrous and when it does not contain oxygen in the form of oxides or other compounds.

In accumulating stoves sintered magnesite (MgO) is generally used as a heat accumulating material. The thermal capacity of this material per unit volume and weight is relatively low. As a result, such ovens generally have a larger volume than other known heating devices. Accumulating ovens which contain cast iron as a heat accumulating material are also sometimes used in central heating installations. It is true that the thermal capacity per unit volume of this material is slightly larger than that of magnesite, but the thermal capacity per unit weight is clearly less than that of magnesite. This means that due to the large floor load, such stoves can only be accommodated economically in cellars of large buildings.

The high price, the limited availability and the relatively high melting temperature stand in the way of using lithium fluoride on a large scale as a material for storing thermal energy. In addition there are only few, very expensive materials which are corrosion resistant for a long period at temperatures of more than 800°C. The object of the present invention is to provide a solution to these problems.

SUMMARY OF THE INVENTION

It was found that the envisaged object may be achieved by a heat accumulator comprising a reservoir which contains an inorganic material having a melting point of less than 850°C. Means for supplying and conducting away heat is characterized in that the inorganic material consists mainly of a eutectic mixture of lithium fluoride and one or more fluorides chosen from the group constituted by sodium fluoride, potassium fluoride, calcium fluoride and magnesium fluoride, on the understanding that potassium fluoride as well as calcium fluoride can only be present in combination with sodium fluoride or magnesium fluoride in addition to lithium fluoride in the eutectic mixture, and this in quantities of less than 30 mol percent of potassium fluoride and less than 40 mol percent of calcium fluoride.

Eutectic mixtures having larger quantities of potassium fluoride or calcium fluoride are found to have a too low thermal content to be technically usable. In the eutectic mixtures which are used according to the invention potassium fluoride and calcium fluoride serve in the first place to get a relatively low eutectic melting point. Suitable eutectic mixtures including potassium fluoride and calcium fluoride contain sodium fluoride or magnesium fluoride in addition to lithium fluoride.

The heat of fusion and the thermal capacity of the fluorides of sodium, potassium, calcium and magnesium are relatively high by themselves, but the high melting temperature stands in the way of using the pure fluorides for storing heat in the form of latent melting heat.

By adding a fluoride to lithium fluoride the melting point is of course decreased. For use in a heat accumulator this is, however, not sufficient. In order to avoid demixing of the melt and deposition of the higher melting fluorides, particularly at those areas where heat is taken up, a eutectic mixture is to be chosen.

It was surprisingly found during experiments that the thermal expansion during melting of eutectic mixtures which are used according to the invention is smaller than was to be expected on the ground of calculations based on the thermal expansion during melting of the pure components. The volume of the reservoir must of course correspond to the volume of the heat accumulating material at the highest temperature which is to be allowed during use. The volume of the reservoir may thus be smaller than would be expected when using the eutectic mixtures according to the invention.

The melting point of the eutectic mixtures used according to the invention is generally below 800°C. This means that a larger number of materials is available from which the heat accumulator can be built up.

When using the eutectic mixtures according to the invention, a considerable economy is obtained because the said fluorides are marketed at much lower prices than lithium fluoride. The price of a eutectic mixture, for example, lithium fluoride and magnesium fluoride which has a higher thermal capacity per unit volume than lithium fluoride, is less than half the price of lithium fluoride. In these cases where the thermal capacity is smaller than for lithium fluoride, the difference is so small that the emanative drawback is offset by the advantage of the lower price, the wider availability and the lower melting temperature.

In the Table below several eutectic mixtures are compared mutually and with lithium fluoride, sintered magnesite (MgO) and cast iron. The Table states the quantity of heat which can be accumulated or supplied in the temperature range from 450° to 860°C.

TABLE

| ture range of from 450°C to 860°C | thermal content in the temperature range | | | heat of fusion | |
|---|---|---|---|---|---|
| | melting point | in cal/ml | in cal/gr | in cal/ml | in cal/gr |
| LiF | 848°C | 818 | 470 | 405 | 233 |
| 60 mol.% LiF+40 mol.% NaF | 652+C | 735 | 385 | 344 | 180 |
| 67 mol.% LiF+33 mol.% MgF$_2$ | 746°C | 900 | 400 | 462 | 205 |
| 52 mol.% LiF+35 mol.% NaF+13 mol.% CaF$_2$ | 615°C | 720 | 338 | 320 | 150 |
| 46 mol.% LiF+44 mol.% NaF+10 mol.% MgF$_2$ | 630°C | 748 | 368 | 359 | 177 |
| 64 mol.% LiF+30 mol.% MgF$_2$+6 mol.% KF | 713°C | 812 | 381 | 400 | 188 |
| sintered magnesite (MgO) | — | 298 | 105 | — | — |
| cast iron | — | 387 | 553 | — | — |

The Table shows that when using eutectic mixtures at considerably lower temperatures than is the case for lithium fluoride, a considerable quantity of thermal energy can be stored as latent heat of fusion. At temperatures below the melting point of lithium fluoride this makes it possible to store a quantity of heat which is considerably larger than would be possible with the same quantity of lithium fluoride at the same temperature. This means that if the temperature of the molten mixture is not increased too far above the melting point, relatively cheaper materials can be used for those parts which come in contact with the melt than would be possible when using lithium fluoride only.

Furthermore the Table shows that the thermal capacity per unit weight and volume is considerably larger than for sintered magnesite and cast iron. As compared with these materials, the said eutectic mixtures have the advantage that between 450° and 860°C approximately half the accumulated heat can be taken up at a constant temperature. The latter is especially important when using heat accumulators according to the invention in combination with heat energy machines whose output is temperature dependent. By using the latent melting heat it is possible to take up heat during a comparatively long period at a constant temperature and hence a constant output can be obtained.

It is evident that the mixtures need not have an exact eutectic composition at the instant when the reservoir of the heat accumulator is filled with this mixture. A deviation of a few percent (less than, for example, 2 percent by weight) may generally be tolerated. After several times of heating until the mass has melted and after cooling, the excess of one of the components which has a higher melting point than the eutectic composition has deposited and a eutectic mixture is the result. Since this deposition will take place particularly at those areas in the reservoir where heat is taken up, this may result in a poorer transfer of heat. The deviations of the eutectic composition must therefore be preferably as small as is possible in practice. Technical qualities of, for example, 99 percent purity may, however, be used. The presence of small quantities of impurities may result in a small deviation of the previously mentioned melting points. It is, however, desirable that the fluorides used be anhydrous so as to avoid corrosive attack of the reservoir and other metal parts with which the fluorides come in contact and do not contain oxygen in the form of oxides or other compounds. Fluorides may be rendered anhydrous and free from oxygen compounds by treating the fluorides in a molten state with ammonium fluoride or ammonium bifluoride until the melt which was initially opalescent due to the presence of oxygen compounds has become bright.

The heat accumulator according to the invention may be used in combination with any type of hot-gas engine. A description of a hot-gas engine provided with a cylinder in which a piston and a cooperating repeller define a hot space (expansion space) and a cold space is described in Philips Technical Review 20, pages 245-262 1958/1959. If the heater consists of a system of ducts through which the working medium flows on its path to and from the expansion space, these may be in direct heat exchanging contact with the eutectic mixtures in the reservoir of the heat accumulator. If desired the heat may alternatively be transferred with a heat-transferring medium, for example, a liquid Na-K alloy which is circulated in a system which is at one end in heat exchanging contact with the heat accumulator and at the other end with the heater of the hot-gas engine. Also so-called "heat pipes" may be used for this purpose.

In order that the invention may be readily carried into effect it will now be described in detail by way of example with reference to the accompanying diagrammatic drawing which comprises a sole FIGURE.

DESCRIPTION OF THE PREFERRED EMBODIMENT

The FIGURE shows a hot-gas engine 1, a heat accumulator 2, a burner 3 with fuel supply 12, a preheater 4, a system of pipes 5 and 6 and a pump 7 for the supply of air and removal of combustion gases 6, respectively. The air is passed through the preheater 4 in which the combustion gases give off heat to the air. In addition a system of pipes 8 including a pump 9 is provided. The pipes 8 contain a liquid alloy, for example, a sodium-potassium alloy. Under those circumstances when combustion gases can or may be removed in the atmosphere, heat is supplied in the burner 3 to the liquid alloy which is circulated in the system of pipes 8. Coming from the burner the heated liquid alloy first flows through the heat accumulator 2 and through a number of pipes 8'. The accumulator comprises a reservoir 10 filled with one of the said eutectic mixtures, for example, 67 mol. percent LiF and 33 mol. percent MgF$_2$. Part of the thermal energy is passed on to the eutectic mixture. Subsequently the alloy flows along the heater 11 of the hot-gas engine and via the pump 9 back to the burner. In the heater 11 part of the heat is passed on to the hot-gas engine. During the periods when combustion gases cannot or may not be removed in the atmosphere, the heat stored in the heat accumulator 2 is transferred by means of the liquid alloy circulated through the pipes 8 to the heater 11 of the hot-gas engine 1.

It is of course alternatively possible to store electrical heat in the heat accumulator. To this end electrical heating elements are provided in and/or around the heat accumulator. If desired a burner, for example, for emergency cases may also be present in such a system.

What is claimed is:

1. In combination a heat accumulator comprising a reservoir which contains an inorganic material having a melting point of less than 850° and wherein the inorganic material consists mainly of a eutectic mixture of lithium fluoride and at least one fluoride selected from the group consisting of sodium fluoride, potassium fluoride, calcium fluoride and magnesium fluoride, potassium fluoride or calcium fluoride being present only in the presence of both sodium fluoride and lithium fluoride or both magnesium fluoride and lithium fluoride, the maximum quantity of potassium fluoride being less than 30 mol percent and the maximum quantity of calcium fluoride being less than 40 mol percent, a hot gas engine having a heater which receives thermal energy from said material, a burner in which is burned fuel in combustion gas to produce thermal energy, duct means for flowing said material (a) through said burner for receiving thermal energy therefrom, (b) to and through said heat accumulator, (c) to and through said heater, and back to said burner, and pump means for urging said material to flow through said duct means.

2. A hot gas engine having a heater in combination with a heat supply for said engine comprising a burner in which is burned fuel in combustion gas to produce thermal energy, means for introducing said fuel and gas thereto, a heat accumulator comprising a reservoir which contains an inorganic material having a melting point of less than 850° and wherein the inorganic material consists mainly of a eutectic mixture of lithium fluoride and at least one fluoride selected from the group consisting of sodium fluoride, potassium fluoride, calcium fluoride and magnesium fluoride, potassium fluoride or calcium fluoride being present only in the presence of both sodium fluoride and lithium fluoride or both magnesium fluoride and lithium fluoride, the maximum quantity of potassium fluoride being less than 30 mol percent and the maximum quantity of calcium fluoride being less than 40 mol percent, duct means for flowing said material successively and cnotinuously through said burner, heat accumulator, and heater, and pump means for causing said material to flow through said duct means.

3. Apparatus according to claim 2, wherein the inorganic material consists of a eutectic mixture of lithium fluoride and sodium fluoride.

4. Apparatus according to claim 2, wherein the inorganic material consists of a eutectic mixture of lithium fluoride and magnesium fluoride.

5. Apparatus according to claim 2, wherein the inorganic material consists of a eutectic mixture of lithium fluoride, sodium fluoride and calcium fluoride.

6. Apparatus according to claim 2, wherein the inorganic material consists of a eutectic mixture of lithium fluoride, sodium fluoride and magnesium fluoride.

7. Apparatus according to claim 2, wherein the inorganic material consists of a eutectic mixture of lithium fluoride, magnesium fluoride and potassium fluoride.

8. In a heat accumulating oven a heat accumulator comprising a reservoir which contains an inorganic material having a melting point of less than 850° and wherein the inorganic material consists mainly of a eutectic mixture of lithium fluoride and at least one fluoride selected from the group consisting of sodium fluoride, potassium fluoride, calcium fluoride and magnesium fluoride, potassium fluoride or calcium fluoride being present only in the presence of both sodium fluoride and lithium fluoride or both magnesium fluoride and lithium fluoride, the maximum quantity of potassium fluoride being less than 30 mol percent and the maximum quantity of calcium fluoride being less than 40 mol percent, said accumulator being the source of thermal energy for said oven, and means for transferring said thermal energy from said accumulator to said oven.

* * * * *